(12) United States Patent
Dittrich

(10) Patent No.: US 7,657,221 B2
(45) Date of Patent: Feb. 2, 2010

(54) VIRTUAL ORAL RECITATION EXAMINATION APPARATUS, SYSTEM AND METHOD

(75) Inventor: William A. Dittrich, Vancouver, WA (US)

(73) Assignee: Northwest Educational Software, Inc., Vancouver, WA (US)

( * ) Notice: Subject to any disclaimer, the term of this patent is extended or adjusted under 35 U.S.C. 154(b) by 141 days.

(21) Appl. No.: 11/264,984

(22) Filed: Nov. 1, 2005

(65) Prior Publication Data
US 2007/0072165 A1 Mar. 29, 2007

Related U.S. Application Data

(60) Provisional application No. 60/716,476, filed on Sep. 12, 2005.

(51) Int. Cl.
G09B 7/00 (2006.01)
(52) U.S. Cl. .................. 434/353; 434/322; 434/350; 434/354
(58) Field of Classification Search .......... 434/353–354
See application file for complete search history.

(56) References Cited

U.S. PATENT DOCUMENTS

| 5,487,671 | A | * | 1/1996 | Shpiro et al. | 434/185 |
|---|---|---|---|---|---|
| 5,503,560 | A | * | 4/1996 | Stentiford | 434/167 |
| 5,766,015 | A | * | 6/1998 | Shpiro | 434/156 |
| 5,791,904 | A | * | 8/1998 | Russell et al. | 434/185 |
| 6,175,841 | B1 | * | 1/2001 | Loiacono | 715/205 |
| 6,302,695 | B1 | * | 10/2001 | Rtischev et al. | 434/157 |
| 6,366,759 | B1 | * | 4/2002 | Burstein et al. | 434/353 |
| 6,461,166 | B1 | * | 10/2002 | Berman | 434/323 |
| 6,953,344 | B2 | * | 10/2005 | Shafrir | 434/323 |
| 7,088,949 | B2 | * | 8/2006 | Burstein et al. | 434/353 |
| 2002/0068264 | A1 | * | 6/2002 | Gu et al. | 434/323 |
| 2003/0031996 | A1 | * | 2/2003 | Robinson | 434/350 |
| 2006/0257841 | A1 | * | 11/2006 | Mangano | 434/354 |

OTHER PUBLICATIONS

Speech Technology Center, "Trawl Audio Analysis Software". Available before Jan. 14, 2005. Retrieved from http://www.speechpro.com on Oct. 22, 2007.*

* cited by examiner

Primary Examiner—Cameron Saadat
(74) Attorney, Agent, or Firm—Ater Wynne LLP

(57) ABSTRACT

The invented apparatus, system and method for examining a student's oral answer capability includes a presentation mechanism for presenting a program test including one or more questions and soliciting one or more answers as oral inputs; a voice recognition mechanism for receiving a voice stream from a student oral recitation and for converting the voice stream to text-based essay form and for recording the same as a first given answer; answer key data stored in memory, the answer key data representing an ideal answer; a correlation mechanism coupled with the first given answer and with the stored answer key data for comparing the given answer to the stored answer key; and a grading mechanism coupled with the correlation mechanism for assigning a point score representing the merit of the given answer relative to the stored answer key data, wherein the point score represents the level of correlation therebetween.

9 Claims, 1 Drawing Sheet

VIRTUAL ORAL RECITATION EXAMINATION APPARATUS, SYSTEM AND METHOD

RELATED APPLICATIONS

The present application claims priority to U.S. Provisional Patent Application Ser. No. 60/716,476, entitled VIRTUAL ORAL RECITATION EXAMINATION and filed Sep. 12, 2005, the disclosure of which is incorporated herein in its entirety by this reference.

BACKGROUND OF THE INVENTION

This invention relates generally to the field of teaching. More particularly, it concerns assessment or examination systems and methods used by teachers to measure students' oral recitation and learning development.

1. Field of the Invention

The present invention relates to a method whereby a software program is used to administer and grade a question given to a student for the purpose of training (learning) or assessment (examination). This recitation/examination is performed solely by using voice recognition computer software, and requires no time involving the teacher in this training and assessment method.

2. Prior Art

Voice recognition software is in use for the purpose of creating text (word) documents from speech without the need for typing. These voice recognition programs are progressively being improved and can be created in any language. In education, voice recognition software has been of limited use solely for the purpose of creating a text document from speech without typing.

In some instances, Voice Recognition software and a computer are used in assessment. In Alaska and in Holland, students are allowed to use Voice Recognition software to create a text document for an examination if the student has a disability and cannot type. The teacher reviews and grades the resulting text document. Also, in language classes voice recognition software is used to create text documents that the teacher evaluates for the purpose of assessing the students verbal skills in the language being taught. In all these cases, the teacher manually grades and evaluates the resulting text document, which makes these uses of voice recognition software fall within the prior art.

SUMMARY OF THE INVENTION

The invented system for examining a student's oral answer capability includes a presentation mechanism for presenting a program test including one or more questions and soliciting one or more answers as oral inputs; a voice recognition mechanism for receiving a voice stream from a student oral recitation and for converting the voice stream to text-based essay form and for recording the same as a first given answer; answer key data stored in memory, the answer key data representing an ideal answer; a correlation mechanism coupled with the first given answer and with the stored answer key data for comparing the given answer to the stored answer key; and a grading mechanism coupled with the correlation mechanism for assigning a point score representing the merit of the given answer relative to the stored answer key data, wherein the point score represents the level of correlation therebetween. The invented method includes setting a task for a student, the task involving presentation of a question on an audio or visual presentation device; devising a model answer to the question and storing the answer as first text data in a memory; providing an audio input mechanism for the student's oral answer to the question; converting the student's oral answer to second text data; and comparing the first and second text data to assess a level of correlation therebetween; and grading the student's oral answer based upon the level of correlation to produce a student grade.

DETAILED DESCRIPTION OF THE PREFERRED EMBODIMENTS

Figure 1:
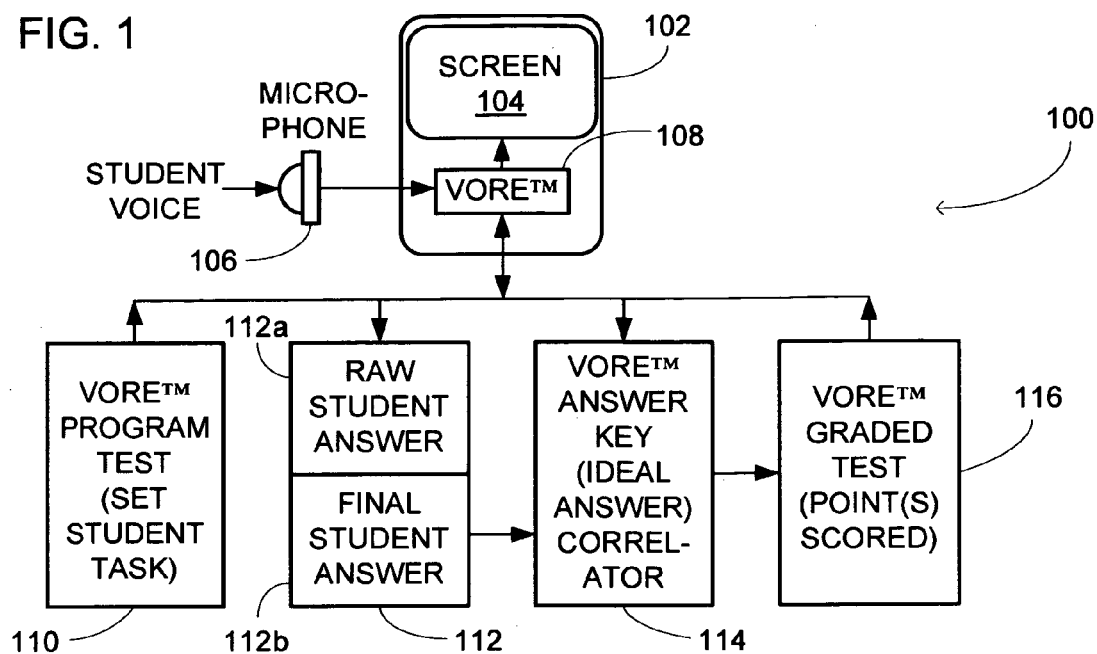
FIG. 1 is a system block diagram illustrating the system and process flow in accordance with one embodiment of the invention.

No computer software program is known to exist which automatically evaluates and grades a text document created by voice recognition software for the purpose of oral training or examination. This unique aspect of this invention allows the teacher to utilize oral recitation and examination in the course of education because it does not require the large amount of time required to administer such tasks without the use of a computer and this unique type of software program.

Thus, it is an object of the present invention to provide a new software program and code, which enables a teacher to administer and grade an oral homework question or test question solely by computer using voice recognition software and VORE™ TASK Code, VORE™ being a trademark of sole inventor of the present invention.

It is also an object of this invention to create a method whereby a teacher can implement verbal tasks both in training and assessment without the time intensive method of listening to and grading the task without the use of a computer.

It is also an object of this invention to dramatically improve teaching and learning in the field of education by making oral communication a vital part of the learning process through practice and training. This important aspect of learning has been underutilized in the past because of the demanding time requirements of oral homework questions and oral examinations.

It is also an object of this invention to incorporate oral communications skills into the learning and assessment process of education to benefit student achievement for students with differing learning styles and/or disabilities.

It is also the object of this invention to enable the use of voice identification software for the purpose of positive identification of the student taking an oral computer based test. This is particularly useful for use in testing and assessment in distance learning courses administered and "attended" only electronically.

It is also the object of this invention to enable use of more sophisticated or advanced evaluation methods to be utilized for assessment and grading of the oral answers given by the student. As software programming techniques and methods improve in the future, evaluation of the oral answer can go beyond simple content. Then necessary elements of an ideal oral answer such as syntax, structure, inflection, volume, dramatic pause, detrimental pause, and timing can be evaluated and reflected in the score awarded to the student's oral answer. This would be particularly useful in an application like practicing and evaluating student final oral arguments in law school.

There are two aspects of verbal communication —written and oral. Historically, only written communication skills have been emphasized, for the most part, in education. Students are required to produce written homework assignments, essays and reports. Students are required to take written tests in all disciplines including humanities, science, engineering and mathematics courses. It is not practical for teachers to utilize oral learning tasks and oral examinations due to the time required manually to deliver these learning and assessment methods to large numbers of students. As a result, students can lack a vital part of learning by not fully developing verbal communication skills.

The Virtual Oral Recitation/Examination (VORE™) software programming code is a new tool for learning and assessment which enables the teacher to assign oral work questions and give oral examinations without the burden of time involvement. These VORE™ TASKS are performed by the student with the aid of a computer and software. The graded results of these oral tasks are available immediately to the teacher (and the student) with little time involvement. When implemented on a large scale, it will revolutionize education and produce a dramatic increase in the level of educational tools worldwide.

FIG. 1 is a system block diagram associated with the VORE™ TASK Code which unites the output of the voice recognition software to the grammar and sentence check software. The VORE™ TASK Code then provides the final grade for the oral question by comparison to an ideal answer word document. System 100 preferably includes a presentation mechanism 102/104 for presenting a program test 110 including one or more questions and soliciting one or more answers 112 as oral inputs; a voice recognition mechanism 106/108 for receiving a voice stream from a student oral recitation and for converting the voice stream to text-based essay form and for recording the same as a first given answer; answer key data 114 stored in memory, the answer key data representing an ideal answer; a correlation mechanism 114 coupled with the first given answer and with the stored answer key data for comparing the given answer to the stored answer key; and a grading mechanism 116 coupled with the correlation mechanism for assigning a point score representing the merit of the given answer relative to the stored answer key data, wherein the point score represents the level of correlation therebetween.

Thus, the VORE™ TASK software code unites existing software programs in the areas of voice recognition and English sentence structure and grammar check. For example, the VORE™ TASK Code would unite the voice recognition software Dragon Naturally Speaking (www.1st-dragon.com), for example, with the essay evaluation software StyleWriter, for example. The VORE™ TASK software evaluates and grades the student's verbal answer. The software code for evaluation could be specifically written for use on simple oral answers as described below, or it could be done by use of existing essay evaluation software programs like SAGrader™ with Qualrus™ using semantic analysis methods, Criterion which includes "e-rater" used to score GMAT essays (Educational Testing Service), Intellimetric (Vantage Learning), MapleTA from MapleSoft or many other evaluation software tools available today. By uniting the voice recognition program with any of the currently available evaluation software or an evaluation software code created in the future specifically designed for use with verbal answers, the VORE™ Technology is a software utility that does more than each element of code it unites. The use of this software technology will solve the problem of the lack of oral training in education today.

The essence of the VORE™ technology is the use of computer code to connect voice recognition software output in text document format with essay or written document evaluation software code. This combination enables the computer to evaluate, correct and assess or grade verbal answers and presentations. This software link can be direct within one computer or indirect. In the indirect embodiment, one computer would produce the electronic or printed text document from voice recognition software (for example at the student's home) and the written document presented to the teacher at school. The teacher would then evaluate the answer(s) by scanning the word document with text recognition and essay grading software. Another more common example of the indirect linking method is for use in recitation and assessment or examination in so-called "distance learning" courses over the Internet. In this embodiment, the student uses the remote computer at home to answer the question(s) into voice recognition software that creates the text document. This text document can then be electronically transferred to the administrator of the distance learning course for evaluation and storage by and in the administrator's computer. One very desirable advantage of this embodiment of the VORE™ Technology is in the area of security in the process of course administration.

Security for the creation and evaluation of text documents is becoming an ever more important concern in all areas of education. Plagiarism, cheating and impersonation are more easily accomplished today. This is an obvious result of the use of computers and the Internet resources by students in the endeavor to fulfill course requirements. This concern for security and identification of the examinee is most critical in administration of distance learning courses provided over the Internet. This produces a devaluation of degrees earned solely through distance learning courses. Clearly, this is a present and serious problem that limits the impact and credibility of Internet courses and degree programs.

The VORE™ Technology solves this problem with the use of voice identification software programs and equipment to positively identify the student's co-called "voice print" as the student answers all questions orally during the exam. This can be accomplished by requiring the person registering for the distance learning course to give a voice sample to the administrator's computer in person with verification of their picture identification. Thereafter, the administrator has a positively identified digitized voice print of the student prior to the recitation or examination.

Subsequently, VORE™ TASKS performed by the student can be positively identified by comparing the oral answer with the identified digital student voice print. This process is not further discussed or illustrated herein as it is known to those of skill in the art. While methods to identify the person typing or keying a text document exist (the so-called "type print" of a student), voice print identification is a more advanced, accepted and used technology. Thus, it is better suited for use as the preferred method of security for the VORE™ Technology. Commercially available software and hardware for this purpose is available on the market now. An excellent example of these products is the TRAWL software and Smart Logger available from the Speech Technology Center (www.speechpro.com).

The first step in utilizing the VORE™ Technology is the creation of a question. When an oral question is written, a detailed ideal answer is then prepared in the form of a text document (ideal answer). The ideal answer contains a number of identified key words, concepts and linked words and concepts. The student verbally answers the question into a computer equipped with voice recognition software. The voice recognition software creates a word document called the raw student answer (RSA). This RSA is scanned by grammar check and sentence structure check software to create a corrected final student answer (FSA) text document. The VORE™ Task software then compares the FSA to the ideal answer and awards one or more points for every keyword, concept or linked concepts found in the FSA. Upon completion of all oral questions, the VORE™ Task software automatically compiles a total grade for the oral recitation/examination. This grade and the final student answers are then stored for future examination by the teacher. This progression of operation of the VORE™ task software is shown in FIG. 1.

Referring now to FIG. 1, it will be appreciated that the system described briefly above is indicated at 100. The invented system in accordance with one embodiment includes a computer 102 having a display screen 104 for storing in memory and presenting for display one or more questions posed as part of the automated examination as well as for storing in memory and presenting for display the student's recognized oral answer in text form. A microphone 106 conditions the student's voice for conversion to recognized speech stored in connection with VORE™ software 108 residing in memory and executing in a processor within a computer. Those of skill in the art will appreciate that the VORE™ software can reside and execute alternatively on a host platform that may be remote from the student's computer, e.g. over the Internet. Such voice signal conditioning, recognition, storage and presentation can be done conventionally, and will not be described in more detail here.

Blocks 110, 112, 114 and 116 will be understood to represent key software elements of the invented VORE™ Technology that inform system 100 in accordance with one embodiment of the invention. Those of skill in the art will appreciate that the functions of blocks 110, 112, 114 and 116 representing the invented apparatus within the spirit and scope of the invention can be performed by a computer or processor located anywhere, e.g. on a remote server, rather than on a local student processor such as student computer 102.

Block 110 represents the VORE™ program test function that sets a student task such as one or more questions requiring one or more corresponding oral essay answers. It will be appreciated by those of skill in the art that functional block 110 represents one or more databased questions in text or oral form for presentation on computer screen 104 of student computer 102.

Block 112 represents the VORE™ student answer processor that spell and grammar checks and corrects the raw student answer 112*a* to produce a final student answer 112*b* for grading purposes. The function performed by this block will be appreciated as conforming raw student answer 112*a* to a form that is compatible with grading while leaving its content substantially intact. Those of skill will appreciate that, within the spirit and scope of the invention, such may not be required or desired in certain applications, since it effectively assists the student and improves the student's oral answer in important areas of pronunciation (that may affect spelling by the voice recognition software) and grammar or syntax. In any event, if it is desired, the number of corrections to spelling and/or grammar that are needed to convert raw student answer 112*a* into final student answer 112*b* can be used to discount the student's final grade. In other words, students who recite all the proper key words and phrases and links therebetween nevertheless can be distinguished from one another by rewarding the student with the fewer spelling and grammar errors with a higher grade.

Block 114 represents the VORE™ answer key or ideal answer correlator that compares the student's final answer with the answer devised by the instructor. Those of skill in the art will appreciate that the ideal answer is a text document that is produced either by the instructor's writing or orally presenting an answer that represents what the instructor thinks should be found in a good student's answer(s) to the question(s) posed by the instructor. As described below by way of example, the ideal answer typically includes key concepts, phrases and words that are used by system 100 automatically to score and grade the student's oral recitation. Those of skill in the art will appreciate that the correlation software can include fit-matching (so-called "best fit" algorithm) or syntax-checking algorithms to further measure the quality of the student's oral presentation. This could be provided as an alternative to the spell-checking, grammar-checking and/or syntax-checking function of block 112.

Block 116 represents the VORE™ graded test with an assigned point score in accordance with the scoring method to be described in detail below by the examination example. Those of skill in the art will appreciate that the VORE™ graded test can be presented on screen 104 of student computer 102. In this novel way, the student gets nearly immediate feedback on his or her progress in oral presentation, since the graded test in accordance with invented system 100 is automatically generated by computer and the results are nearly immediately returned to the student within mere seconds of the student's oral recitation.

As an example of this invented system and method, one would create a question such as "Why is the sky blue?" Then an ideal answer would be created by typing into a text document or by voice recognition software creating a text document. Ideally, the voice recognition software would be used because writing an answer and speaking an answer involve different brain activities, creation speed and document length. Different styles and outcomes would be expected when comparing the ideal answer created from a written answer and an oral answer to the same question. By using the voice recognition software to create the ideal answer, the problem of grading a student oral answer by comparing it to a teacher's written ideal answer is eliminated.

One such answer to the above question is as follows:

In order to understand why the sky is blue, one must understand why any object presents its color to the viewer. The color of an object is carried to the observer by light created by, or reflected from (in the case of a solid or liquid) or scattered from (in the case of a gas) the object. Sir Isaac Newton discovered that white light consists of many colors ranging from red (which is low energy and longer wavelength) to violet (which is high energy and shorter wavelength). Newton used a prism to disperse the white light into colors of the spectrum. Thus the color of a red object is explained by the fact that all colors incident onto the object are absorbed and only red wavelengths of light are reflected and received by the observer. Thus, the observer sees the object as being red.

When observing the sky it appears blue because the lower energy photons of light are less prevalent than the higher energy blue photons. This is because blue and violet light bend more when scattering off of air molecules or groups of molecules. This extra bending of blue light sends it towards the ground and the observer, giving the sky a blue color. This scattering process is called Rayleigh scattering and was first investigated by an Englishman named John W. Strutt and published in 1903. This phenomenon was theoretically verified by Lord Rayleigh, who was a very famous English physicist at that time. He showed that the intensity of scattered light was inversely proportional to the fourth power of the wavelength. Thus, blue and violet light are scattered five times more than red. The sky is not violet because nitrogen in the air absorbs the violet frequencies.

Not only does this phenomenon called Rayleigh scattering account for the blueness of the sky, but it also explains the redness of the sunset. Here light reaching the observer passes through a greater column of air when compared to light reaching the observer during midday. The scattering process removes blue and violet light leaving the sunset red.

The teacher would then determine key words, phrases, and linked concepts using this example of the many ways to empower the VORE™ Technology software with information required for evaluation of the answer. Key words and phrases would be underlined. Linked words, phrases and concepts would be marked with various punctuation marks as shown below:

In order to understand why the sky is blue (1), one must understand why any object presents its color to the viewer. The color (2) of an object is carried (2) to the observer by light (2) created by, or reflected from (in the case of a solid or liquid) or scattered from (in the case of a gas) the object. Sir Isaac Newton discovered that white light (3) consists of many colors (3) ranging from red (which is low energy and long wavelength) to violet (which is high energy and shorter wavelength)). Newton used a prism to disperse the white light into colors of the spectrum. Thus the color of a red object is explained by the fact that all colors incident onto the object are absorbed and only red wavelengths of light are reflected and received by the observer. Thus, the observer sees the object as being red.

When observing the sky it appears blue because the lower energy photons of light are less prevalent than the higher energy blue photons. This is because blue and violet light bend more (4) when scattering off of air (4) molecules or groups of molecules. This extra bending of blue light sends it towards the ground and the observer, giving the sky a blue color. This scattering process is called # Rayleigh scattering (5)# and was first investigated by an Englishman named John W. Strutt (6) and published in 1903. This phenomenon was theoretically verified by Lord Rayleigh, who was a very famous English physicist at that time. He showed that the #intensity of scattered light was inversely proportional to the fourth power of the wavelength (7)#. Thus, blue and violet light are scattered five times more than red. The sky is not violet (8) because nitrogen (8) in the air absorbs (8) the violet frequencies.

Not only does this phenomenon called Rayleigh scattering account for the blueness of the sky, but it also explains the redness (9) of the sunset (9). Here light reaching the observer passes through a greater column of air when compared to light reaching the observer during midday. The scattering (10) process removes blue and violet (10) light leaving the sunset red.

In this example, keywords and phrases are programmed for the VORE™ Technology software code to recognize and assess. This is done by underlining (or otherwise highlighting or identifying) these words and combinations of words that represent key phrases. These key phrases are grouped by a number from one to ten. Upon comparing the Final Student Answer with the ideal answer, the VORE™ Technology software searches for these key phrases in the final student answer. If there is a match the software code records one point. A maximum of ten points would be available in this embodiment. Although any number of points could be utilized, experience in teaching usually results in a convenient ten point system. A match could be made even if the final student answer did not exactly match the phrase underlined. This would be done by listing for each numbered key phrase alternate likely ways to say the same thing. For example, in the above answer for key phrase (8), phrases like "violet does not get through", "violet is stopped", or "violet is blocked" would be on the alternate phrase list and would be counted as a match.

Linked concepts could be programmed for assessment using simple punctuation marks and keyboarding symbols (#, ^, &, *, + and so forth). For example key phrase (5) and key phrase (7) in the above example are marked with the # symbol before and after the phrase. This links these two key phrases and the VORE™ software awards an extra point if these key phrases are both in the answer.

Of course there are many embodiments for the VORE™ Technology software for every specific and different method of verbal answer assessment via computer. This above example is one of many possible. It is a simple example while the other essay and word document evaluation tools mentioned above are both more complex and currently available. Within the spirit and scope of the invention, point scoring and other aspects of the invention can be accomplished in alternative ways. For example, the score components can be weighted differently to reward more writing craft or background study on the part of the student, by assigning higher points for more obscure knowledge or language mastery. Conversely, fewer or no points can be awarded to the more obvious or general knowledge of the subject matter or for less craft or care in the expression thereof.

The VORE™ Technology software simply utilizes these software programs for the evaluation of written word documents derived from verbal answers. The VORE™ Technology would be useful in most subject areas in education and it would be very much desired for use by students. Students love to play computer games and VORE™ tasking would be like a verbal computer game. They would want to study more and retake the task for a higher score. VORE™ tasking would be self motivating.

Again, this invention utilizes existing software in the area of voice recognition and grammar and sentence structure evaluation. The invention is new and inventive in that the VORE™ task software unites existing software to produce a useful utility which does more together than the component software does separately. It is synergistic in its use. It solves a major problem facing education today, which is the incorporation of effective oral training into education. It has tremendous value for students with differing learning styles, and students with disabilities. A blind student or a student without the motor skills required for hand writing or keyboarding could excel in the VORE™ Technology. This invention can be utilized in all languages as voice recognition software is available in many languages.

Students, e.g. English as a Second Language (ESL) students in an English speaking school, who have difficulty pronouncing their words in English would also benefit from the VORE™ Technology software. This is a result of the use of Voice Recognition software in the VORE™ Technology. Essentially the voice recognition software must search the entire dictionary to find the correct word spoken. It is very easy for the software to produce a false match and enter into the text Document an incorrect word. However, with the VORE™ software, special weight could be given to the words in the ideal answer in the voice recognition software search for the correct word. In this search, a student with good verbal skills in English could produce two possible matches with the dictionary while an ESL student may produce ten or more possible matches. In both cases the VORE™ software would award a point for a correct match because of this weighting of the words in the ideal answer. However, at the end of the task, the VORE™ Technology software would force the student with more than ten matches to repeat the word over and over (with pronunciation tutoring) until the number of possible matches is reduced to a desired level. As a result, with properly programmed VORE™ software code, students learn pronunciation while performing homework and examinations.

Figure 2:
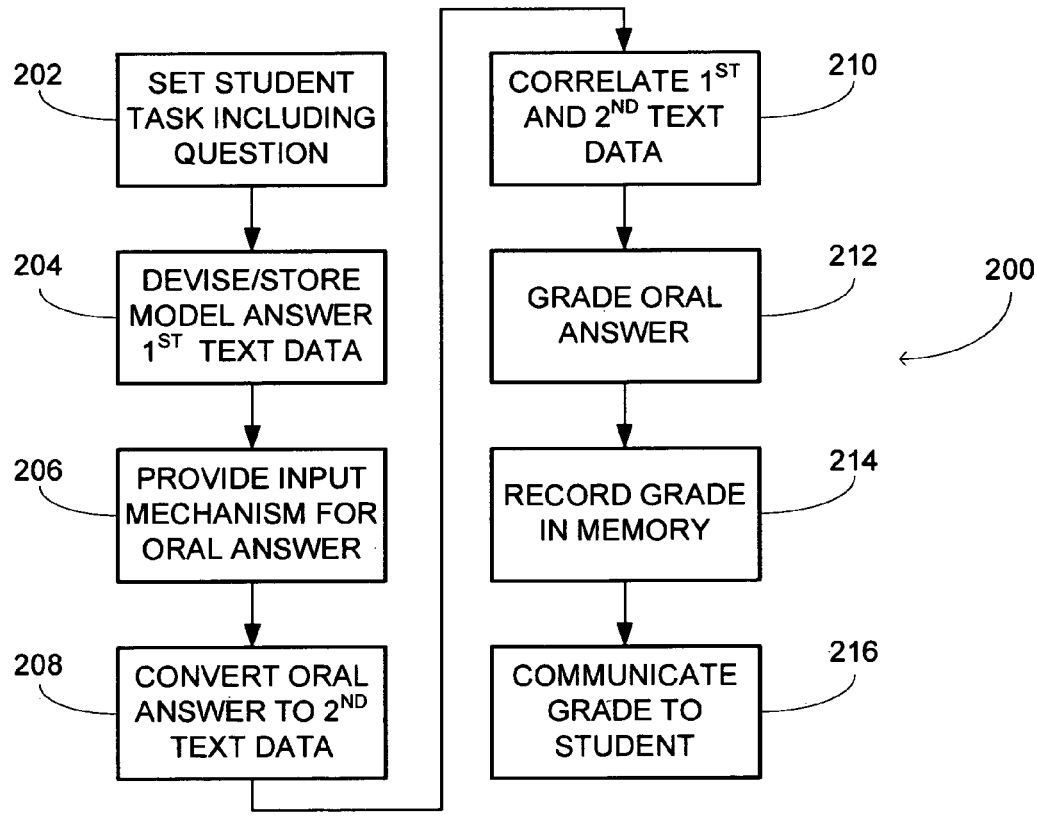
FIG. 2 is a flowchart illustrating the method in accordance with one embodiment of the invention.

To briefly summarize the invention, FIG. 2 is a flowchart illustrating the invented method at 200. Method 200 of examining a student's oral answer capability includes a) at 202 setting a student task including a question soliciting an oral response; b) at 204 devising a model answer to the question and storing it as first text data in a memory; c) at 206 providing an input mechanism, e.g. microphone 106, for the inputting of the student's voiced (oral) answer; d) at 208 converting the student's oral answer to second text data stored in a memory; e) at 210 comparing or correlating the first and second text data to determine a correlation level therebetween indicative of the quality and quantity of the student's oral answer; f) at 212 grading the student's oral answer as by awarding points for one or more found key words or phrases or one or more links therebetween; g) at 214 recording the student grade in a memory; and h) at 216 communicating the student grade to the student who gave the oral answer.

It is often said that one does not truly know a subject until one teaches that subject to someone else. This is primarily due to the fact that it is harder to explain something verbally in many different ways than it is to just write an answer once. Teaching and giving oral presentations is therefore a dreaded task for most people. This is simply due to the lack of training in education today in these areas. The invented VORE™ task software could change this worldwide.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

In the field of education, written tasks and tests dominate training and assessment. Oral skills are less often developed via verbally spoken recitations, and oral examinations are rarely given in comparison to written exams. This is primarily due to the time required by the teacher to administer these oral recitations and exams. The Virtual Oral Recitation/Examination (VORE™ TASK) is a computer assisted method of providing oral training and examinations without the need for the instructor to dedicate time in monitoring and administering the oral task. Utilizing an input mechanism that can include a microphone and voice recognition software, the student's oral answer to a question is converted into a text document. The text is then compared by the software to ideal answer text to assess correctness and to score the student response. The grade or score can be immediately communicated to the student and can be stored for archival purposes and review by the instructor. The software can run on a local student computer or can be run on a remote host server, e.g. over the Internet. This invented method of oral training and assessment will revolutionize education and dramatically improve students' mastery of subjects and their ability to verbalize concepts and ideas. Furthermore, the invented apparatus, system and method will greatly free teachers from time-consuming, face-to-face oral testing. The VORE™ TASK can be used in virtually all subject areas in education and in all languages.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that the method, system and apparatus of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. Apparatus for automatically examining a student's oral answer to a question, the apparatus comprising:

an instructor-specified essay form ideal answer stored in a digital memory in text form, the ideal answer including one or more predetermined, instructor-selected and designated key words and/or phrases, wherein the designation comprises highlighting indicia included in the ideal answer, a student's answer given orally in response to an instructor-specified question and stored in a digital memory in text form; and a student answer evaluation and numerical-grade-assigning portion configured as computer-executable code, and comprising;

a student answer examination and correction portion including grammar correction code and/or sentence structure correction code which, when executed by a computing device, is configured to examine and correct one or more of grammar and sentence structure in the stored text form student answer, and to store the corrected student answer in a digital memory in text four;

a comparator mechanism including text correlation assessment code which, when executed by a computing device, is configured to access each of the ideal answer and the corrected student answer from each respective digital memory, and to assess a level of correlation between the ideal answer and the corrected student answer based at least in part upon a substantial semantic similarity between one or more words or phrases in the corrected student answer and the one or more predetermined, instructor-selected and designated key words or phrases in the ideal answer; and an automated numerical-grade assigning grading mechanism operatively coupled with the comparator mechanism and including numerical-grade assigning code which, when executed by a computing device, is configured to automatically calculate and assign a point score to the corrected student answer, by recording at least one point for each of a key word or phrase in the corrected student answer that semantically corresponds to at least one of the one or more predetermined key words or key phrases in the ideal answer, and to store the numerical student grade in a digital memory, wherein the point score comprises the recorded points and indicates a numerically-expressed level of correlation along a scale of possible correlation levels between the corrected student answer and the ideal answer.

2. The apparatus of claim 1 which further comprises:
a voice recognition mechanism for producing the student answer from a student voice stream.

3. The apparatus of claim 2 which further comprises:
a voice recognition mechanism for producing the ideal answer from an instructor voice stream.

4. The apparatus of claim 3 which further comprises:
an input/output (I/O) mechanism configured for audio or visual presentation of a question posed by an instructor and of the answer given by a student.

5. The apparatus of claim 4, wherein the I/O mechanism is configured further for audio or visual presentation of the instructor-specified ideal answer.

6. The apparatus of claim 5, wherein the I/O mechanism is configured further for audio or visual presentation to the student of the numerical point score from the grading mechanism.

7. The apparatus of claim 2, wherein upon receiving a portion of the student voice stream and producing more than a predetermined acceptable number of possible word matches with a dictionary utilized by the voice recognition mechanism to produce the student answer, the voice recognition mechanism is configured to prompt the student to repeat the portion of the voice stream until the voice recognition mechanism produces a predetermined acceptably small number of possible word matches.

8. The apparatus of claim 1, further comprising:
a voice identification means configured to receive and retain a previously submitted sample student voice print, to produce a voice print from the student's oral answer, to compare the sample voice print and the student's oral answer-produced voice print, and to indicate a level of identity correlation between a provider of the sample voice print and the student providing the oral answer.

9. The apparatus of claim 1, wherein the grading mechanism further includes code which, when executed by a computing device, is configured to reduce the numerical point score by an amount corresponding to an extent of any corrections to one or more of the spelling, grammar and sentence structure in the stored text form student answer.

* * * * *